United States Patent
Kircher, Jr. et al.

[15] 3,691,240
[45] Sept. 12, 1972

[54] PROCESS FOR CHLORINATION, DEHYDROCHLORINATION AND PURIFICATION OF ORGANIC COMPOUNDS

[72] Inventors: Charles E. Kircher, Jr., Detroit; Donald R. McAlister, Livonia, both of Mich.; Doris LeRoy Brothers, Mason, Ohio

[73] Assignee: Detrex Chemical Industries, Inc., Detroit, Mich.

[22] Filed: Oct. 6, 1969

[21] Appl. No.: 866,097

Related U.S. Application Data

[63] Continuation of Ser. No. 638,468, May 15, 1967, abandoned, which is a continuation-in-part of Ser. Nos. 587,259, Oct. 17, 1966, abandoned, and Ser. No. 565,095, July 14, 1966, Pat. No. 3,631,207.

[52] U.S. Cl. ........260/654 D, 260/654 H, 260/659 R
[51] Int. Cl..............................................C07c 21/00
[58] Field of Search.......260/654 H, 654 D, 660, 658

[56] References Cited

UNITED STATES PATENTS

| | | | |
|---|---|---|---|
| 3,065,280 | 11/1962 | Vogt | 260/659 |
| 2,593,451 | 4/1952 | Hill et al. | 260/654 |
| 3,299,152 | 1/1967 | Inaba et al. | 260/654 |

*Primary Examiner*—Leon Zitver
*Assistant Examiner*—Alan Siegel
*Attorney*—Paul & Paul

[57] ABSTRACT

A process is provided for producing trichlorethylene, tetrachlorethylene or mixtures thereof including the steps of (1) reacting chlorine and ethylene in a liquid body containing predominantly chlorethanes, which chlorethanes have an average composition of at least 2.5 chlorine atoms per molecule; (2) maintaining the chlorethanes at a temperature in the range of 0° to 250° C.; (3) removing at least a portion of said chlorethanes and separating said removed material into a heavier product fraction containing a predominant amount of chlorethane having at least four chlorine atoms per molecule and a lighter fraction having an average chlorine content which is lower than that of said first fraction, the ratio of the number of mols of the heavier fraction to the number of mols of the lighter fraction being in the range of 1:0.1 to 1:30; (4) employing at least a portion of the said lighter fraction as liquid body in a subsequent chlorination reaction in accordance with steps (1), (2) and (3); and (5) dehydrochlorinating the heavier product fraction of step (3) by (6) maintaining the heavier product fraction at an elevated temperature in the liquid state while under positive pressure and in the presence of activated carbon.

8 Claims, 1 Drawing Figure

| STREAM | NAME |
|---|---|
| A | CHLORINE |
| B | ETHYLENE |
| C | LIGHTS RECYCLE |
| D | REACTOR EFFLUENT |
| E | HEAVIES STILL FEED |
| F | DEHYDROCHLORINATOR FEED |
| G | DEHYDROCHLORINATOR EFFLUENT |
| H | TRICHLORETHYLENE |
| I | PERCHLORETHYLENE |
| J | TETRAS & PENTA |

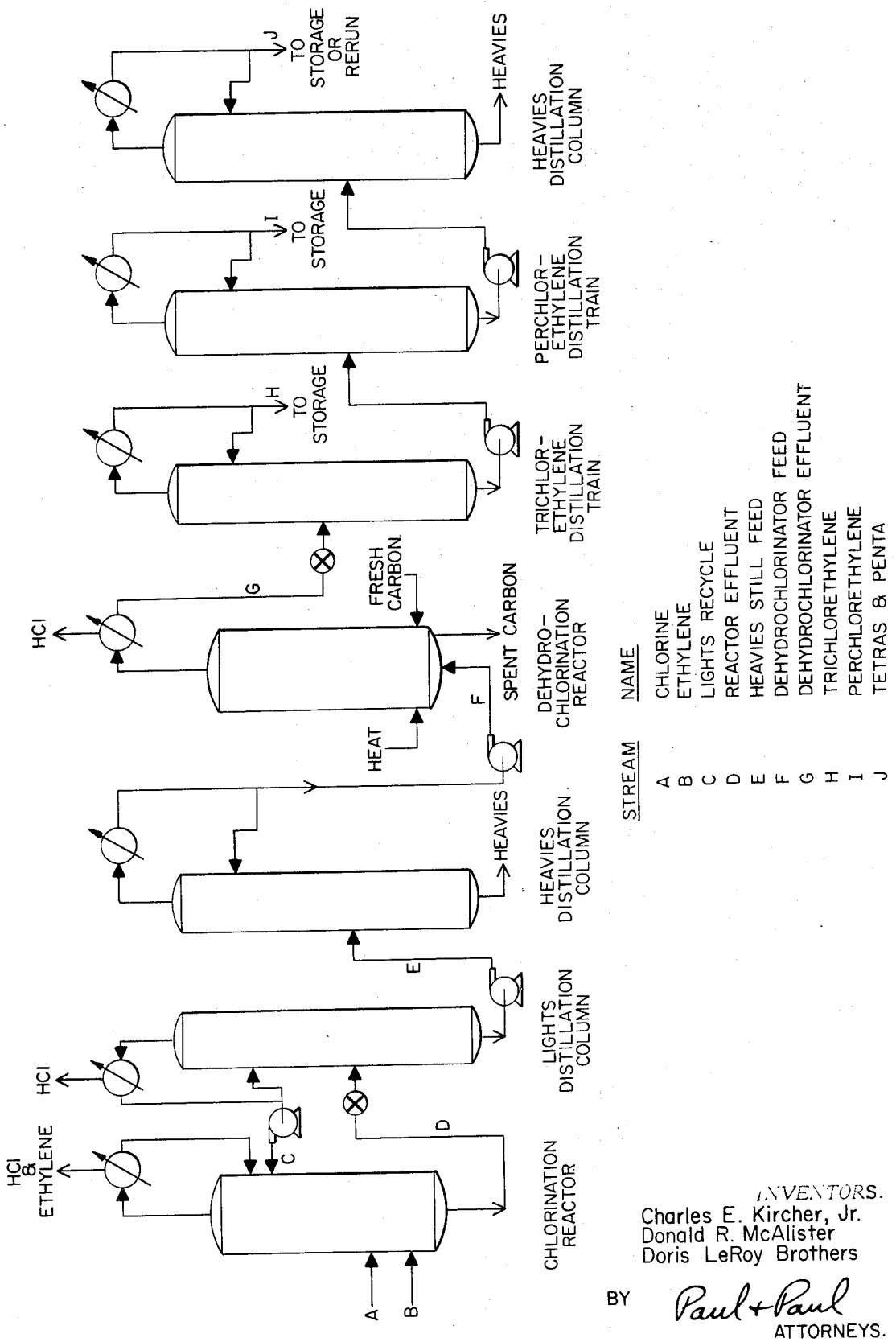

PROCESS FOR CHLORINATION, DEHYDROCHLORINATION AND PURIFICATION OF ORGANIC COMPOUNDS

This application is a continuation of our application, Ser. No. 638,468, filed May 15, 1967, now abandoned, which was a continuation-in-part of our application, Ser. No. 587,259, filed Oct. 17, 1966, now abandoned, and our application, Ser. No. 565,095, filed July 14, 1966, now U.S. Pat. No. 3,631,207.

BACKGROUND OF THE INVENTION

1. Field of the Invention

This invention relates to a continuous process for the production of trichlorethylene, tetrachlorethylene or mixtures thereof by the dehydrochlorination of chlorethanes having at least four chlorine atoms per molecule, and particularly to such a process wherein said chlorethanes have been produced by an improved chlorination process.

2. Description of the Prior Art

One of the known methods for dehydrochlorinating polychlorinated ethanes consists of subjecting such compounds to a pyrolytic reaction in which they are heated to a temperature which is sufficiently high to cause dissociation into chlorinated olefin compounds and hydrogen chloride. Such high temperature pyrolytic reactions usually involve passing a heated vapor over a heated bed as in the case of British Pat. No. 697,482, but it has also been proposed to use a heated surface immersed in a liquid chlorinated hydrocarbon as in the case of British Pat. No. 774,125. In either case, an elevated temperature of the order of 400°–1,200° C. at the reaction surface is relied upon for the pyrolytic dehydrochlorination reaction. Somewhat lower reaction temperatures are possible by dehydrochlorination in the vapor phase using a bed made up of activated carbon as in the case of U. S. Pat. No. 2,898,383.

An alternative dehydrochlorination method, which has been known for a long time and which has been widely practiced commercially, comprises reacting chlorinated ethanes with an inorganic alkaline chemical, such as lime, or with organic bases, such as alkyl amines.

The use of metal chlorides has also been proposed for some dehydrochlorination reactions, but these reactions have not included the commercial production of trichlorethylene and/or perchlorethylene because of undesirable side reactions.

While the known methods for dehydrochlorinating polychlorinated ethanes are capable of producing chlorinated ethylene products, they have certain inherent disadvantages. In the prior art pyrolytic methods, the by-products formed during pyrolysis are carbonized at the elevated temperature of the reactor and this reduces the effectiveness of the reaction surface, thus requiring the use of even more heat until finally the reactor must be taken out of service and the contaminated reaction surface cleaned. Moreover, it is difficult to prevent decomposition of the desired dehydrochlorinated product within the reaction zone through over-pyrolysis.

In the methods involving chemical dehydrochlorination by inorganic alkaline chemicals or organic bases, the hydrogen chloride which is split off reacts with the inorganic alkaline chemical to form a chloride salt or reacts with the organic base to form a hydrochloride salt. Consequently, the hydrogen chloride is not recovered in a useful form. A further disadvantage in the use of organic bases, such as triethylamine or quinoline, arises from the fact that some of the organic base is continuously lost in the reaction and such organic bases are expensive. When an organic base is used for dehydrochlorination, a salt thereof is formed with hydrogen chloride, which salt may or may not be economically recoverable. Consequently their use in dehydrochlorination reactions is not economically feasible. Moreover, where strong alkaline chemicals are used, further dehydrochlorination of the products may occur and this is particularly undesirable. In the present invention the disadvantages present in the prior known dehydrochlorination methods applicable to polychlorinated ethanes have been overcome in a controlled process which is capable of producing predetermined desired chlorinated ethylene products together with hydrogen chloride in recoverable form from compounds selected from the group consisting of tetrachlorethanes and pentachlorethane or mixtures thereof at a cost which is competitive with any method now in commercial use for producing the corresponding dehydrochlorinated ethylenes, namely trichlorethylene and tetrachlorethylene.

Highly chlorinated ethanes such as the tetrachlorethanes and pentachlorethane are useful in the production of chlorinated olefin solvents such as trichlorethylene and perchlorethylene, which solvents are of great commercial importance. However, the methods employed by prior workers for the production of the tetrachlorethanes and pentachlorethane have involved the use of costly and elaborate processing procedures and/or the use of expensive reagents. For example, tetrachlorethanes have been formed by the addition of chlorine to acetylene while pentachlorethane has been formed by the dehydrochlorination of tetrachlorethane to trichlorethylene and chlorine addition to the trichlorethylene. Despite prior work concerning the chlorination or ethylene, no processes have been developed whereby a product predominantly comprised of the tetrachlorethanes, pentachlorethane or mixtures thereof were produced by ethylene chlorination procedures.

Prior workers experimenting with the chlorination of ethylene have observed the formation of minor quantities of the highly chlorinated ethanes but have not successively developed techniques adapted for the production of these chlorethanes as the predominant products. For the purpose of this invention, predominant products means that at least 60 percent by weight, and preferably at least 75 percent by weight of the products consist of chlorethanes having 4, 5 or 6 chlorine atoms per molecule.

SUMMARY OF THE INVENTION

One of the objects of the present invention is to provide a process for producing trichlorethylene or tetrachlorethylene or mixtures thereof from symmetrical tetrachlorethane (1,1,2,2), asymmetrical tetrachlorethane (1,1,1,2), pentachlorethane or mixtures thereof.

A further object of this invention is to provide a process for producing trichlorethylene or tetrachlorethylene or mixtures thereof from the above-mentioned polychlorinated ethanes wherein the dehydrochlorination process is carried out with the polychlorinated compound or compounds being maintained under pressure in liquid phase and with the dehydrochlorination products being evolved within the liquid phase and on passing out of the liquid phase automatically form a vapor phase which contains hydrogen chloride, saturated chlorinated ethanes and the unsaturated chlorinated ethylenes resulting from the dehydrochlorination reaction.

A still further object is to provide a process for producing trichlorethylene or tetrachlorethylene or mixtures thereof through a controlled dehydrochlorination of a liquid polychlorinated ethane mixture of tetrachlorethanes or pentachlorethane, or both, maintained under a predetermined pressure and temperature, such as to produce in good yields the desired chlorinated ethylene products and HCl.

It is another object of the present invention to provide a process for the production of chlorethanes having at least four chlorine atoms per molecule, especially the tetrachlorethanes, pentachlorethane, and mixtures thereof.

It is another object of the invention to provide a process for the production of these chlorethanes by a reaction involving the chlorination of ethylene and less highly chlorinated ethanes.

It is another object of this invention to provide a process for the production of chlorethanes having at least 4 chlorine atoms per molecule which utilizes the chlorine reactant substantially completely.

Further objects will be apparent from the following description of the invention.

BRIEF DESCRIPTION OF THE DRAWING

The drawing is a flow diagram of a preferred embodiment of the process of this invention.

DESCRIPTION OF THE PREFERRED EMBODIMENTS

We have discovered that the objects set forth above are attained by a controlled process in which certain chlorinated ethanes are maintained in liquid phase and under a pressure substantially in excess of atmospheric in the presence of activated carbon immersed therein, while supplying heat to control the temperature of the liquid substantially above the temperature at which HCl is evolved but below 300° C. The process can be carried out as a continuous process or as a batch process. By selecting the proper liquid phase composition containing predominantly the above-mentioned chlorinated ethane or ethanes and a feed stock composed of these chlorinated compounds and by maintaining a predetermined temperature and a predetermined pressure, the process continuously produces a preselected chlorinated ethylene product or products and HCl in recoverable form. In the case of tetrachlorethanes and pentachlorethane this provides the great advantage of being able to operate the process to produce predominantly trichlorethylene or predominantly tetrachlorethylene or a mixture thereof in a predetermined ratio. Likewise, the process has the flexibility of operating on mixtures of polychlorinated ethanes or on individual polychlorinated ethanes.

In accordance with the present invention, the polychlorinated ethane is admixed with carbon and subjected to liquid phase dehydrochlorination at temperatures of about 150° C. to below 300° C., more preferably 170° to 275° C., and most preferably 190° to 250° C.

It is important in the practice of the present process that the dehydrochlorination be carried out at temperatures from about 150° C. to below about 300° C. In systems involving the dehydrochlorination of tetrachlorethanes and pentachlorethane, severe catalyst deactivation takes place at temperatures exceeding about 300° C., the deactivation being more severe the higher the temperature.

Surprisingly, the reaction of this invention is readily accomplished at temperatures below 300° C., even though the dehydrochlorination of compounds having chlorine attached to a primary carbon atom is involved. In this regard, the art teaches that with higher monochlorinated alkanes primary chlorides will not dehydrochlorinate except at temperatures in excess of 300° C. Contrary to such teachings, the compounds having chlorine substituted on a primary carbon atom which are reacted in accordance with the process of the present invention have been found to undergo dehydrochlorination readily and conveniently in liquid phase at much lower temperatures. An outstanding advantage resulting from this is that catalyst life is improved.

During the dehydrochlorination, vapors comprising the polychlorinated ethane together with the dehydrochlorination products are evolved and are removed from the reaction zone.

It has been found that by operating in the prescribed manner outstanding results are achieved. Exceedingly high reaction selectivities at good reaction rates are attained while at the same time process costs are minimized and catalyst life is extended.

It is to be noted by way of contrast that in the previous vapor phase technology such reaction system control could not be achieved except in a limited way be decrease in process conversion.

In addition to the above, practice of the invention has other advantages as follows:

By carrying out the dehydrochlorination from a liquid phase rather than a vapor phase, the size of reactor required is greatly reduced and the necessity of vaporizing and preheating the feed stream is avoided. This represents a saving in both investment cost and operating cost.

Since the dehydrochlorination reaction is endothermic and cannot proceed at a rate faster than the required heat can be supplied, a great advantage arises by operating with a liquid phase rather than a vapor phase since much higher rates of heat transfer into the liquid phase can be obtained.

By dehydrochlorinating from a liquid phase, it is necessary to operate under a total pressure greater than the vapor pressure of the liquid phase at the temperature of operation. Through the use of such operating pressures, the HCl formed as a result of the dehydrochlorination reaction is automatically available at the pressure of operation. This makes possible the removal and recovery of organic vapors from the HCl by condensing them in a water or brine cooled condenser and makes available a purified HCl supply for industrial use at moderate to high pressure without the need for compression.

In carrying out the present invention, high concentrations of the polychlorinated ethane and relatively low chlorinated ethylene product concentrations are maintained in the liquid phase. This means that the activated carbon is used to better advantage since the active surface of the carbon is in contact with the saturated compound to be dehydrochlorinated rather than the unsaturated product compound which requires no further activation.

A very important technical and economic advantage is that it is possible to add and remove incremental quantities of activated carbon to the system without interrupting the continuous operation of the process. This capability is generally not present in the prior art vapor phase carbon catalyzed processes. Since there is a gradual loss of activity of activated carbon during use in dehydrochlorination reactions, ultimate replacement of the carbon is necessary. The ability to add and remove carbon while operating, and thereby maintain catalyst efficiency at a more or less constant level, has both technical and economic advantage over the prior art processes in which carbon efficiency steadily declines during its operating life.

The activated carbons used commercially in vapor phase dehydrochlorination processes consist of particles which, in most cases, would not pass through a U. S. standard 20-mesh screen. In order to minimize pressure drop across the catalyst in a fixed bed vapor phase reactor, the size of the carbon particles used is such that they would not pass through a U. S. standard 10-mesh screen. Since practically all of the active catalyst surface is associated with the extremely small diameter pores of the carbon structure which lie below the surface of the particle, it is necessary for the feed and product components to diffuse into and out of the pores of the carbon as the dehydrochlorination reaction proceeds. This vapor phase diffusion into and out of the pores of the carbon is one of the rate limiting factors of the operation. This serious limitation is almost completely obviated in the present process since, by dehydrochlorinating in the liquid phase, the activated carbon catalyst can be finely divided so as to pass through a U. S. standard screen of 325 mesh or finer, without any disadvantage from a handling point of view. For a given weight of carbon, the smaller the particle size, the greater is the exposed surface area and the greater is the exposed surface area for molecules to diffuse into the internal pores of the carbon. Also, by placing the activated carbon in the liquid phase, under moderate to high pressure, there is a positive driving force which tends to keep all of the pores of the carbon filled with the liquid to be dehydrochlorinated. A maximum use of the catalytic surface of the carbon is thereby realized in the new process whether fine or coarse carbon particles are used.

In accordance with the present invention, it has been found that chlorethanes having predominantly at least four chlorine atoms per molecule can be produced by the following method:

1. Chlorine and ethylene are introduced into a liquid body of chlorethanes, the said liquid chlorethanes containing an average of at least 2.5 and usually at least three chlorine atoms per molecule; the chlorine being introduced at a rate of at least about 3 mols chlorine per mol ethylene reacted;

2. the liquid body is maintained at chlorination reaction conditions within the temperature range of from about 0° C. to less than about 250° C. and within the pressure range of from atmospheric pressure to about 500 p.s.i.g.;

3. a portion of the liquid body is removed and separated into a chlorethane produce fraction having an average chlorine content of at least four chlorine atoms per molecule and a second chlorethane fraction having an average chlorine content which is lower than that of a said first fraction, the mol ratio of the first fraction to the second fraction being in the range 1:0.1 to 1:30, and usually in the range 1:0.1 to 1:19;

4. preferably all but at least a portion of the said second fraction is used in the liquid body in subsequent chlorination;

5. the chlorethane product having an average chlorine content of at least four chlorine atoms per molecule is recovered from the chlorethane product fraction of step 3.

By the above procedure it has been found that highly chlorinated ethanes, e.g., ethanes having four to six chlorine atoms per molecule can conveniently be produced in a simple and straight-forward manner. Thus, using relatively inexpensive charge materials it is possible to prepare tetrachlorethanes, pentachlorethane and mixtures of these products for dehydrochlorination in accordance with the process of this invention.

Throughout the present specification the production of tetrachlorethanes is described. Normally, symmetrical tetrachlorethane, $CHCl_2—CHCl_2$, and asymmetrical tetrachlorethane, $CCl_3—CH_2Cl$, are formed in about equal amounts. However, where significant quantities of pentachlorethane are also formed, the amount of asymmetrical tetrachlorethane predominates slightly relative to the symmetrical tetrachlorethane due to the somewhat faster reaction rate of symmetrical tetrachlorethane with chlorine to form pentachlorethane. Normally the asymmetrical to symmetrical tetrachlorethane ratio will be from about 1:1 to about 3:2.

In accordance with the present invention, the chlorination reaction is carried out at temperatures generally under 250° C., preferably in the range of from about 50° C. to about 200° C., and more preferably from about 90° C. to about 150° c.

It is necessary that the reaction be carried out in the liquid phase and, accordingly, pressure in the reaction zone should be sufficient to maintain the liquid phase. Pressures broadly in the range of from atmospheric pressure to about 500 p.s.i.g. are suitable, while more preferred pressures are in the range of from about 25 p.s.i.g. to about 250 p.s.i.g., and most preferably the pressure is maintained within the range of from about 50 p.s.i.g. to about 150 p.s.i.g.

In a particularly preferred mode of operation, the exothermic heat of chlorination is removed at least in part by continuously vaporizing part of the reaction liquid during the chlorination, removing the vapors overhead, condensing the chlorethane content of said vapors and returning this condensate to the reaction zone. Other cooling means such as the provision of indirect heat exchange in or outside of the reaction zone can be employed, preferably in conjunction with the partial vaporization techniques above described.

As an essential aspect of practice of the present invention, the composition of the liquid body of chlorethanes in the chlorination zone must be such that the average chlorine content is at least 2.5 atoms of chlorine per molecule of chlorethane. In a continuous system this composition of the liquid body is maintained throughout the reaction whereas in a batch system the liquid body has this composition at least during the last stages of the chlorination. The maintenance of such a liquid composition is necessary in order that the production of the desired highly chlorinated ethane products be achieved. As another important consideration, in order to sustain the desired production of the highly chlorinated ethane products, ethylene must be introduced together with chlorine into the chlorination zone. The total amount of chlorine which is introduced will depend both on the composition of the net feed to the reaction zone and upon the desired chlorination product, but must be at a rate of at least about 3 mols of chlorine per mol of ethylene which is reacted. Depending upon the composition of the feed, the chlorine should be introduced in amounts sufficient to provide for the desired production of the particular highly chlorinated product or products desired. Also, sufficient ethylene must be added such that at least 5 percent and preferably at least 10 percent of the reacting chlorine undergoes addition reaction with the ethylene.

An important feature in the practice of the present invention is the avoidance in the chlorination zone of materials which are detrimental to the desired production of the highly chlorinated ethane products. It has been determined that compounds of iron, aluminum, mercury and oxygen have a distinctly disadvantageous effect on the desired reaction, and the presence of these materials in an amount sufficient to interfere significantly with the reaction should be avoided. Frequently it is desirable to operate with equipment which is non-ferrous. Specifically, reactors and other equipment constructed of non-ferrous materials, e.g., nickel clad iron, Inconel, are particularly preferred in carrying out the process of this invention. For the purpose of this invention, the amount of iron, calculated as ferric chloride should be less than about 0.006 percent by weight of the liquid reaction body, preferably less than about 0.0015 percent by weight of the liquid reaction body. Best results are achieved where the amount of iron is less than 0.001 percent calculated as above.

An outstanding advantage of the process of this invention is that by proper process control an exceedingly broad range of production distributions can be obtained. For example, it is possible to obtain as product essentially only tetrachlorethanes or essentially only pentachlorethane, or any desired ratio of these materials, or mixtures predominating in tetrachlorethanes and/or pentachlorethane and associated with beta trichlorethane, or hexachlorethane, etc. Selectivities adapted to a particular economic situation can be achieved by appropriate process regulation.

In continuous processing, at appropriate conditions of temperature and pressure, the following are important considerations in a particular practice of the invention:

1. For a particular product fraction composition, increased ratios of recycle to product give higher reaction selectivities, the limit on recycle being the economics of a particular situation.

2. Changing the average chlorine content of the liquid body in the chlorination zone will change the product distribution, other things being equal. For example, recycle of a less chlorinated fraction will result in the production of a less highly chlorinated product mixture.

3. At a given recycle ratio and for a given product distribution, the reaction selectivity can be increased by recycling a less chlorinated stream. Conversely, at a given selectivity and product distribution the recycle ratio can be varied quite considerably depending upon the chlorine content of the recycle stream — i.e., the more highly chlorinated recycle streams require higher recycle ratio at the same selectivity and product distribution.

The regulation of the process to achieve particular results will be further illustrated subsequently by way of working examples.

Although the invention is especially adapted for continuous operation, batch procedures can also be employed.

Referring to the drawing, the chlorination reaction is carried out in the chlorination reactor. Maintained in the chlorination reactor is a liquid mixture consisting essentially of chlorethanes and having a composition such that there is an average of at least 2.5, and usually at least three chlorine atoms per molecule of chlorethane A chlorine stream A is introduced into the chlorination reactor in an amount sufficient to provide for the production of the desired product within the limitations heretofore expressed. An ethylene stream B is introduced into the chlorination reactor, and a mixture of chlorethane lights which have been separated from the product fraction is returned to the chlorination reactor as lights recycle C.

In the chlorination reactor the various materials fed to the chlorination zone react to form the desired highly chlorinated ethane product.

The composition of the total mixture fed to this reaction zone will depend on the distribution of the chlorinated product. In order to produce the desired tetrachlorethanes, pentachlorethane, and the like it is necessary that the chlorination in the chlorination reactor be carried out in a liquid mixture which contains a high chlorine content, i.e., in a mixture of liquid chlorethanes having an average of at least 2.5 chlorine atoms per molecule.

The chlorination reaction is exothermic and the reaction heat is removed by a combination of cooling coils (not shown) and vaporization of part of the liquid chlorethane mixture. The vapor mixture of chlorethanes together with HCl is removed from the reactor and may be taken off as shown. Some of this vapor mixture passes to a condenser wherein the chlorethanes are condensed and returned to the chlorination reactor. The non-condensed HCl vapors are passed through suitable pressure regulating means (not shown) to conventional recovery procedures.

A reactor effluent D is continuously removed from the chlorination reactor and passes through a reducing valve into the lights distillation column. This reactor effluent contains both chlorethanes having four or more chlorine atoms per molecule as well as chlorethanes having less than four chlorine atoms per molecule. The liquid mixture is fractionally distilled in the lights distillation column and there is recovered a lighter fraction containing HCl vapor together with chlorethanes. A heavier chlorethane product fraction, said fraction having an average chlorine content of at least four chlorine atoms per molecule is separated as heavies still feed E, which fraction is further fractionated in the heavies distillation column. A dehydrochlorinator feed stream F is taken as a distillate from the heavies distillation column, and depending upon the reaction conditions and the separation procedure this feed stream can be tetrachlorethanes, pentachlorethanes, hexachlorethanes, or mixtures of some or all of these materials.

The chlorethanes in the lighter fraction from the lights distillation column are removed and passed to a condenser wherein the chlorethanes are condensed. HCl vapor passes to recovery as heretofore described. A portion of the chlorethane condensate is refluxed to the lights distillation column while the net product of this material passes back to the chlorination reactor. The composition of this return chlorethane fraction as well as the amount of this fraction relative to the amount of the product fraction removed as heavies still feed is important insofar as successful operation of the process is concerned. It is essential that the composition of this return chlorethane fraction be such that the chlorine content be less than that of the heavies still feed. In addition, for successful operation it is necessary that the ratio of the return fraction (lights recycle C) to the product fraction be on a mol basis in the range 0.1:1 to 30:1, preferably 1:1 to 19:1.

The dehydrochlorinator feed stream F is passed as a liquid under positive pressure into the dehydrochlorination reactor while supplying heat to maintain the dehydrochlorination reaction. The pressure in the dehydrochlorinator is preferably maintained in the range of from about 35 p.s.i.a. to about 300 p.s.i.a. Dehydrochlorination of the cracker feed F takes place in the dehydrochlorination reactor giving trichlorethylene, perchlorethylene and HCl as the main reaction products. The combined liquid and vapor stream leaving the dehydrochlorination reactor is cooled while still under pressure, the resulting condensed and cooled chlorinated organics passing as cracker effluent G into a series of distillation trains, resulting in trichlorethylene H, perchlorethylene I and heavier chlorinated hydrocarbons such as tetrachlorethanes and pentachlorethane J streams to storage or rerun.

It will thus be seen that broadly, the continuous process of this invention comprises a process for producing trichlorethylene, tetrachlorethylene or mixtures thereof which comprises the steps of:

1. reacting chlorine and ethylene in a liquid body containing predominantly chlorethanes, said liquid body having an average composition of at least 2.5 chlorine atoms per molecule;
2. maintaining said liquid body at a temperature in the range of 0° to 250° C.;
3. removing at least a portion of said liquid body and separating said removed liquid body into a heavier product fraction containing a predominant amount of chlorethane having at least four chlorine atoms per molecule and a lighter fraction having an average chlorine content which is lower than that of said first fraction, the mol ratio of the heavier fraction to the lighter fraction being in the range 1:0.1 to 1:30;
4. employing at least a portion of the said lighter fraction as liquid body in a subsequent chlorination reaction in accordance with steps (1), (2) and (3); and
5. dehydrochlorinating the heavier product fraction of step (3).

The following examples illustrate the process of this invention.

EXAMPLE I

Ethylene was continuously fed into a liquid-phase reactor at a rate of 1.1 mols/hr., together with chlorine at a rate of 3.40 mols/hr., and recycle stream at a rate of 2.97 mols/hr., said recycle stream having the following composition:

| Compound | Mol % |
| --- | --- |
| 1,2-dichlorethane | 7.26 |
| 1,1,2-trichlorethane | 51.86 |
| tetrachlorethanes | 40.88 |
| pentachlorethane | NIL |
| hexachlorethane | NIL |
| Total | 100.00 |

Vent gases containing unreacted ethylene, together with volatilized chlorinated hydrocarbons and HCl were withdrawn and subjected to condensation; condensed chlorinated hydrocarbons were returned to the reactor, and the net cooled gas consisted largely of unconverted ethylene and HCl made in the reactor. During this period, the reactor was maintained at a temperature of 140° C. and at a pressure of 100 p.s.i.g. Chlorine conversion was essentially complete, and ethylene conversion was approximately 90 percent. Reactor contents were continuously withdrawn at the rate of 3.97 mols/hr. and had a composition, exclusive of dissolved HCl as follows:

| Compound | Mol % |
| --- | --- |
| 1,2-dichlorethane | 5.43 |
| 1,1,2-trichlorethane | 38.80 |
| tetrachlorethanes | 46.57 |
| pentachlorethane | 8.44 |
| hexachlorethane | 0.76 |
| Total | 100.00 |

The withdrawn stream was distilled in a multi-tray fractionation column with an overhead pressure of 17 p.s.i.a. and temperature of 265° F. and a bottoms pressure of 22.6 p.s.i.a. and temperature of 325° F. The overhead fractionation was condensed and recycled to the chlorination zone as above indicated. The net product was recovered as the bottoms stream at the rate of 1.00 mols per hour and had a composition as follows:

| Compound | Mol % |
| --- | --- |
| 1,2-dichlorethane | NIL |
| 1,1,2-trichlorethane | NIL |
| tetrachlorethanes | 63.47 |
| pentachlorethane | 33.53 |
| hexachlorethane | 3.00 |
| Total | 100.00 |

This net product may readily be converted by dehydrochlorination at a production rate of 0.622 mols/hr. trichlorethylene and 0.329 mols/hr. perchlorethylene.

EXAMPLE 2

Ethylene was continuously fed into a liquid-phase reactor at a rate of 1.05 mols/hr., together with chlorine at a rate of 3.62 mols/hr., and a recycle stream at a rate of 3.85 mols/hr., said recycle stream having the following composition:

| Compound | Mol % |
| --- | --- |
| 1,2-dichlorethane | 5.19 |
| 1,1,2-trichlorethane | 37.05 |
| tetrachlorethanes | 57.76 |
| pentachlorethane | NIL |
| hexachlorethane | NIL |
| Total | 100.00 |

Vent gases containing unreacted ethylene, together with volatilized chlorinated hydrocarbons and HCl were withdrawn and subjected to condensation; condensed chlorinated hydrocarbons were returned to the reactor, and the net cooled gas consisted largely of unconverted ethylene and HCl made in the reactor. During this period, the reactor was maintained at a temperature of 150° C. and at a pressure of 100 p.s.i.g. Chlorine conversion was essentially complete, and ethylene conversion was approximately 95 percent. Reactor contents were continuously withdrawn at the rate of 4.85 mols/hr. and had a composition, exclusive of dissolved HCl as follows:

| Compound | Mol % |
| --- | --- |
| 1,2-dichlorethane | 4.12 |
| 1,1,2-trichlorethane | 29.40 |
| tetrachlorethanes | 54.79 |
| pentachlorethane | 10.66 |
| hexachlorethane | 1.03 |
| Total | 100.00 |

The withdrawn stream was distilled in a multi-tray fractionation column with an overhead pressure of 17 p.s.i.a. and temperature of 273° F. and a bottoms pressure of 22.0 p.s.i.a. and temperature of 330° F. The overhead fractionation was condensed and recycled to the chlorination zone as above indicated. The net product was recovered as the bottoms stream at the rate of 1.00 mols per hour and had a composition as follows:

| Compound | Mol % |
| --- | --- |
| 1,2-dichlorethane | NIL |
| 1,1,2-trichlorethane | NIL |
| tetrachlorethanes | 43.30 |
| pentachlorethane | 51.70 |
| hexachlorethane | 5.00 |
| Total | 100.00 |

This net product may readily be converted by dehydrochlorination at a production rate of 0.424 mols/hr. trichlorethylene and 0.507 mols/hr. perchlorethylene.

EXAMPLE 3

Ethylene was continuously fed into a liquid-phase reactor at a rate of 1.1 mols/hr., together with chlorine at a rate of 3.58 mols/hr., and a recycle stream at a rate of 10.4 mols/hr., said recycle stream having the following composition:

| Compound | Mol % |
| --- | --- |
| 1,2-dichlorethane | 4.91 |
| 1,1,2-trichlorethane | 35.26 |
| tetrachlorethanes | 59.83 |
| pentachlorethane | NIL |
| hexachlorethane | NIL |
| Total | 100.00 |

Vent gases containing unreacted ethylene, together with volatilized chlorinated hydrocarbons and HCl were withdrawn and subjected to condensation; condensed chlorinated hydrocarbons were returned to the reactor, and the net cooled gas consisted largely of unconverted ethylene and HCl made in the reactor. During this period, the reactor was maintained at a temperature of 160° C. and at a pressure of 100 p.s.i.g. Chlorine conversion was essentially complete and ethylene conversion was approximately 90 percent. Reactor contents were continuously withdrawn at the rate of 11.4 mols/hr. and had a composition, exclusive of dissolved HCl, as follows:

| Compound | Mol % |
| --- | --- |
| 1,2-dichlorethane | 4.48 |
| 1,1,2-trichlorethane | 32.17 |
| tetrachlorethanes | 58.50 |
| pentachlorethane | 4.67 |
| hexachlorethane | 0.18 |
| Total | 100.00 |

The withdrawn stream was distilled in a multi-tray fractionation column with an overhead pressure of 17 p.s.i.a. and temperature of 273° F. and a bottoms pressure of 22.0 p.s.i.a. and temperature of 331° F. The overhead fractionation was condensed and recycled to the chlorination zone as above indicated. The net product was recovered as the bottoms stream at the rate of 1.00 mols per hour and had a composition as follows:

| Compound | Mol % |
| --- | --- |

| Compound | Mol % |
| --- | --- |
| 1,2-dichlorethane | NIL |
| 1,1,2-trichlorethane | NIL |
| tetrachlorethanes | 44.67 |
| pentachlorethane | 53.33 |
| hexachlorethane | 2.0 |
| Total | 100.00 |

This net product may readily be converted by dehydrochlorination at a production rate of 0.438 mols/hr. trichlorethylene and 0.523 mols/hr. perchlorethylene.

EXAMPLE 4

Ethylene was continuously fed into a liquid-phase reactor at a rate of 1.02 mols/hr., together with chlorine at a rate of 3.86 mols/hr., and a recycle stream at a rate of 4.24 mols/hr., said recycle stream having the following composition:

| Compound | Mol % |
| --- | --- |
| 1,2-dichlorethane | 3.98 |
| 1,1,2-trichlorethane | 28.43 |
| tetrachlorethanes | 67.59 |
| pentachlorethane | NIL |
| hexachlorethane | NIL |
| Total | 100.00 |

Vent gases containing unreacted ethylene, together with volatilized chlorinated hydrocarbons and HCl were withdrawn and subjected to condensation; condensed chlorinated hydrocarbons were returned to the reactor, and the net cooled gas consisted largely of unconverted ethylene and HCl made in the reactor. During this period, the reactor was maintained at a temperature of 130° C. and at a pressure of 130 p.s.i.g. Chlorine conversion was essentially complete, and ethylene conversion was approximately 98 percent. Reactor contents were continuously withdrawn at the rate of 5.24 mols/hr. and had a composition, exclusive of dissolved HCl, as follows:

| Compound | Mol % |
| --- | --- |
| 1,2-dichlorethane | 3.22 |
| 1,1,2-trichlorethane | 23.00 |
| tetrachlorethanes | 58.90 |
| pentachlorethane | 13.35 |
| hexachlorethane | 1.53 |
| Total | 100.00 |

Upon distillation to provide the amount of recycle stream noted above, the net product was recovered at a rate of 1.00 mols/hr. and had a composition as follows:

| Compound | Mol % |
| --- | --- |
| 1,2-dichlorethane | NIL |
| 1,1,2-trichlorethane | NIL |
| tetrachlorethanes | 22.07 |
| pentachlorethane | 69.93 |
| hexachlorethane | 8.00 |
| Total | 100.00 |

This net product may readily be converted by dehydrochlorination at a production rate of 0.216 mols/hr. trichlorethylene and 0.685 mols/hr. perchlorethylene.

EXAMPLE 5

Ethylene was continuously fed into a liquid-phase reactor at a rate of 1.02 mols/hr., together with chlorine at a rate of 3.86 mols/hr. and a recycle stream at a rate of 9.40 mols/hr., said recycle stream having the following composition:

| Compound | Mol % |
| --- | --- |
| 1,2-dichlorethane | 3.59 |
| 1,1,2-trichlorethane | 25.64 |
| tetrachlorethanes | 63.33 |
| pentachlorethane | 7.44 |
| hexachlorethane | NIL |
| Total | 100.00 |

Vent gases containing unreacted ethylene, together with volatilized chlorinated hydrocarbon and HCl were withdrawn and subjected to condensation; condensed chlorinated hydrocarbons were returned to the reactor, and the net cooled gas consisted largely of unconverted ethylene and HCl made in the reactor. During this period, the reactor was maintained at a temperature of 130° C. and at a pressure of 130 p.s.i.g. Chlorine conversion was essentially complete, and ethylene conversion was approximately 98 percent. Reactor contents were continuously withdrawn at the rate of 10.4 mols/hr. and had a composition, exclusive of dissolved HCl, as follows:

| Compound | Mol % |
| --- | --- |
| 1,2-dichlorethane | 3.24 |
| 1,1,2-trichlorethane | 23.18 |
| tetrachlorethanes | 59.36 |
| pentachlorethane | 13.45 |
| hexachlorethane | 0.77 |
| Total | 100.00 |

Upon distillation to provide the amount of recycle stream noted above, the net product was recovered at a rate of 1.00 mols/hr. and a composition as follows:

| Compound | Mol % |
| --- | --- |
| 1,2-dichlorethane | NIL |
| 1,1,2-trichlorethane | NIL |
| tetrachlorethanes | 22.07 |
| pentachlorethane | 69.93 |
| hexachlorethane | 8.00 |
| Total | 100.00 |

This net product may readily be converted by dehydrochlorination at a production rate of 0.216 mols/hr. trichlorethylene and 0.685 mols/hr. perchlorethylene.

EXAMPLE 6

Ethylene was continuously fed into a liquid-phase reactor at a rate of 1.02 mols/hr., together with chlorine at a rate of 3.82 mols/hr., and a stream at a rate of 8.00 mols/hr., said recycle stream having the following composition:

| Compound | Mol % |
| --- | --- |
| 1,2-dichlorethane | 3.89 |
| 1,1,2-trichlorethane | 27.80 |
| tetrachlorethanes | 68.31 |
| pentachlorethane | NIL |
| hexachlorethane | NIL |
| Total | 100.00 |

Vent gases containing unreacted ethylene, together with volatilized chlorinated hydrocarbons and HCl were withdrawn and subjected to condensation; condensed chlorinated hydrocarbons were returned to the reactor, and the net cooled gas consisted largely of unconverted ethylene and HCl made in the reactor. During this period, the reactor was maintained at a temperature of 130° C. and at a pressure of 130 p.s.i.g. Chlorine conversion was essentially complete, and ethylene conversion was approximately 98 percent. Reactor contents were continuously withdrawn at the rate of 9.00 mols/hr. and had a composition, exclusive of dissolved HCl as follows:

| Compound | Mol % |
| --- | --- |
| 1,2-dichlorethane | 3.46 |
| 1,1,2-trichlorethane | 24.71 |
| tetrachlorethanes | 63.26 |
| pentachlorethane | 8.07 |
| hexachlorethane | 0.50 |
| Total | 100.00 |

Upon distillation to provide the amount of recycle stream noted above, the net product was recovered at a rate of 1.00 mols/hr. and had a composition as follows:

| Compound | Mol % |
| --- | --- |
| 1,2-dichlorethane | NIL |
| 1,1,2-trichlorethane | NIL |
| tetrachlorethanes | 22.91 |
| pentachlorethane | 72.59 |
| hexachlorethane | 4.50 |
| Total | 100.00 |

This net product may readily be converted by dehydrochlorination at a production rate of 0.224 moles/hr. trichlorethylene and 0.711 mols/hr. perchlorethylene.

EXAMPLE 7

Ethylene was continuously fed into a liquid-phase reactor at a rate of 1.02 mols/hr., together with chlorine at a rate of 3.65 mols/hr., and a recycle stream at a rate of 4.24 mols/hr., said recycle stream having the following composition:

| Compound | Mol % |
| --- | --- |
| 1,2-dichlorethane | 4.96 |
| 1,1,2-trichlorethane | 35.42 |
| tetrachlorethanes | 59.62 |
| pentachlorethane | NIL |
| hexachlorethane | NIL |
| Total | 100.00 |

Vent gases containing unreacted ethylene, together with volatilized chlorinated hydrocarbons and HCl were withdrawn and subjected to condensation; condensed chlorinated hydrocarbons were returned to the reactor, and the net cooled gas consisted largely of unconverted ethylene and HCl made in the reactor. During this period, the reactor was maintained at a temperature of 120° C. and at a pressure of 130 p.s.i.g. Chlorine conversion was essentially complete, and ethylene conversion was approximately 98 percent. Reactor contents were continuously withdrawn at the rate of 5.24 mols/hr. and had a composition, exclusive of dissolved HCl, as follows:

| Compound | Mol % |
| --- | --- |
| 1,2-dichlorethane | 4.01 |
| 1,1,2-trichlorethane | 28.66 |
| tetrachlorethanes | 55.99 |
| pentachlorethane | 10.39 |
| hexachlorethane | 0.95 |
| Total | 100.00 |

Upon distillation to provide the amount of recycle stream noted above, the net product was recovered at a rate of 1.00 mols/hr. and had a composition as follows:

| Compound | Mol % |
| --- | --- |
| 1,2-dichlorethane | NIL |
| 1,1,2-trichlorethane | NIL |
| tetrachlorethanes | 40.55 |
| pentachlorethane | 54.45 |
| hexachlorethane | 5.00 |
| Total | 100.00 |

This net product may readily be converted by dehydrochlorination at a production rate of 0.397 mols/hr. trichlorethylene and 0.534 mols/hr. perchlorethylene.

EXAMPLE 8

Ethylene was continuously fed into a liquid-phase reactor at a rate of 0.816 mols/hr. together with ethylene dichloride at a rate of 0.20 mols/hr. and chlorine at a rate of 3.21 mols/hr. and a recycle stream at a rate of 2.07 mols/hr., said recycle stream having the following composition:

| Compound | Mol % |
| --- | --- |
| 1,2-dichlorethane | 7.72 |
| 1,1,2-trichlorethane | 55.18 |
| tetrachlorethanes | 37.10 |
| pentachlorethane | NIL |
| hexachlorethane | NIL |
| Total | 100.00 |

Vent gases containing unreacted ethylene, together with volatilized chlorinated hydrocarbons and HCl were withdrawn and subjected to condensation; condensed chlorinated hydrocarbons were returned to the reactor, and the net cooled gas consisted largely of unconverted ethylene and HCl made in the reactor. During this period, the reactor was maintained at a temperature of 120° C. and at a pressure of 100 p.s.i.g.

Chlorine conversion was essentially complete, and ethylene conversion was approximately 98 percent. Reactor contents were continuously withdrawn at the rate of 3.07 mols/hr. and had a composition, exclusive of dissolved HCl, as follows:

| Compound | Mol % |
| --- | --- |
| 1,2-dichlorethane | 5.21 |
| 1,1,2-trichlorethane | 37.22 |
| tetrachlorethanes | 45.47 |
| pentachlorethane | 10.00 |
| hexachlorethane | 1.30 |
| Total | 100.00 |

Upon distillation to provide the amount of recycle stream noted above, the net product was recovered at a rate of 1.00 mols/hr. and had a composition as follows:

| Compound | Mol % |
| --- | --- |
| 1,2-dichlorethane | NIL |
| 1,1,2-trichlorethane | NIL |
| tetrachlorethanes | 62.82 |
| pentachlorethane | 33.18 |
| hexachlorethane | 4.00 |
| Total | 100.00 |

This net product may readily be converted by dehydrochlorination at a production rate of 0.325 mols/hr. perchlorethylene.

EXAMPLE 9

Ethylene was continuously fed into a liquid-phase reactor at a rate of 1.1 mols/hr., together with chlorine at a rate of 3.65 mols/hr. and a recycle stream at a rate of 7.25 mols/hr., said recycle stream having the following composition:

| Compound | Mol % |
| --- | --- |
| 1,2-dichlorethane | 4.03 |
| 1,1,2-trichlorethane | 20.31 |
| tetrachlorethanes | 75.66 |
| pentachlorethane | NIL |
| hexachlorethane | NIL |
| Total | 100.00 |

Vent gases containing unreacted ethylene, together with volatilized chlorinated hydrocarbons and HCl were withdrawn and subjected to condensation; condensed chlorinated hydrocarbons were returned to the reactor, and the net cooled gas consisted largely of unconverted ethylene and HCl made in the reactor. During this period, the reactor was maintained at a temperature of 160° C. and at a pressure of 100 p.s.i.g. Chlorine conversion was essentially complete, and ethylene conversion was approximately 90 percent. Reactor contents were continuously withdrawn at the rate of 8.25 mols/hr. and had a composition, exclusive of dissolved HCl as follows:

| Compound | Mol % |
| --- | --- |
| 1,2-dichlorethane | 3.54 |
| 1,1,2-trichlorethane | 20.27 |
| tetrachlorethanes | 66.49 |
| pentachlorethane | 7.09 |
| hexachlorethane | 0.61 |
| Total | 100.00 |

Upon distillation to provide the amount of recycle stream noted above, the net product was recovered at a rate of 1.00 mols/hr. and had a composition as follows:

| Compound | Mol % |
| --- | --- |
| 1,2-dichlorethane | NIL |
| 1,1,2-trichlorethane | 20.00 |
| tetrachlorethanes | NIL |
| pentachlorethane | 75.00 |
| hexachlorethane | 5.00 |
| Total | 100.00 |

This net product may readily be converted by dehydrochlorination at a production rate of 0.735 mols/hr. perchlorethylene, with no trichlorethylene being produced.

The results of Examples 1–9, are summarized in Table I, where the results of Examples 1–4 generally indicate the conglomerative effect of control of the product distribution and selectivity by recycle; Example 5 generally shows the effect of recycle composition; Example 6 generally shows the effect of increased total recycle; Example 7 generally shows the effect of product distribution on selectivity; Example 8 shows the effect of a separate feed of chlorinated hydrocarbon having two chlorine atoms per molecule; and Example 9 shows the effect of causing a product distribution including essentially no product having four chlorine atoms per molecule.

The above Examples 1–9 show that in the practice of the process in accordance with our invention, it is possible to produce a preponderance of tetrachlorethanes or pentachlorethane or a designated mixture of both. Referring to Examples 4 and 5, it is seen that in order to attain the same product distribution, where the recycle stream contains more compounds having five chlorine atoms per molecule, additional total recycle is required. Thus an economic comparison of total recycle cost versus distillation cost for the removal of such compounds can be made. Referring to Examples 4 and 6, the effect of increased total recycle is shown, since Example 6 having the higher total recycle, attains a higher selectivity for the same product distribution, (i.e., four-Cl atoms and five-Cl atoms per molecule only). Referring to Examples 4 and 7, the effect of product distribution on selectivity is shown, since for example, Example 7 has a lighter product distribution (four-Cl atoms and five-Cl atoms), and for the same total recycle shows a higher selectivity. Example 8 shows the effect of an outside chlorinated hydrocarbon feed. Example 9 shows the effect of a production distribution in which there are no compounds have four chlorine atoms per molecule.

TABLE I

| Example | 1 | 2 | 3 | 4 | 5 | 6 | 7 | 8 | 9 |
| --- | --- | --- | --- | --- | --- | --- | --- | --- | --- |
| Product (mol percent): | | | | | | | | | |
| 1,1,2-trichlorethane | Nil | Nil | Nil | Nil | Nil | Nil | Nil | Nil | 20.00 |
| Tetrachlorethanes | 63.47 | 43.30 | 44.67 | 22.07 | 22.07 | 22.96 | 40.55 | 62.82 | Nil |
| Pentachorethane | 33.53 | 51.70 | 53.33 | 69.93 | 69.93 | 72.54 | 54.45 | 33.18 | 75.00 |
| Hexachlorethane | 3.00 | 5.00 | 2.00 | 8.00 | 8.00 | 4.50 | 5.00 | 4.00 | 5.00 |
| Total | 100.00 | 100.00 | 100.00 | 100.00 | 100.00 | 100.00 | 100.00 | 100.00 | 100.00 |

TABLE I

| Example | 1 | 2 | 3 | 4 | 5 | 6 | 7 | 8 | 9 |
|---|---|---|---|---|---|---|---|---|---|
| Recycle (mol percent): | | | | | | | | | |
| 1,2-dichlorethane | 7.26 | 5.19 | 4.91 | 3.98 | 3.59 | 3.89 | 4.96 | 7.72 | 4.03 |
| 1,1,2-trichlorethane | 51.86 | 37.05 | 35.26 | 28.43 | 25.64 | 27.80 | 35.42 | 55.18 | 20.31 |
| Tetrachlorethanes | 40.88 | 57.76 | 59.83 | 67.59 | 63.33 | 68.31 | 59.62 | 37.10 | 75.66 |
| Pentachlorethane | Nil | Nil | Nil | Nil | 7.44 | Nil | Nil | Nil | Nil |
| Hexachlorethane | Nil | Nil | Nil | Nil | Nil | Nil | Nil | Nil | Nil |
| Total | 100.00 | 100.00 | 100.00 | 100.00 | 100.00 | 100.00 | 100.00 | 100.00 | 100.00 |
| Total mols of recycle | 2.97 | 3.85 | 10.4 | 4.24 | 9.40 | 8.00 | 4.24 | 2.07 | 7.25 |
| Feed: | | | | | | | | | |
| Mols chlorine | 3.40 | 3.62 | 3.58 | 3.86 | 3.86 | 3.82 | 3.65 | 3.21 | 3.65 |
| Mols ethylene | 1.10 | 1.05 | 1.10 | 1.02 | 1.02 | 1.02 | 1.02 | .816 | 1.10 |
| Ethylene conversion, percent | 90.00 | 95.00 | 90.00 | 98.00 | 98.00 | 98.00 | 98.00 | 98.00 | 90.00 |
| Mols EDC | | | | | | | | 0.20 | |

As has been hereinbefore described, ferric chloride is known as an inhibitor of substitution chlorination. It is known that anhydrous ferric chloride in concentrations of at least 55 ppm reduces the ratio of chlorine to ethylene reacting to 2.0/1. It will be seen from the following Examples 10 and 11, that if all feed and recycle rates are held constant, that operating the process of this invention in the presence of 55 ppm ferric chloride in the reactor as opposed to 2 ppm thereof, causes the net production of materials containing 4 or more chlorine atoms per molecule to drop from 100 percent to 30.5 percent.

EXAMPLE 10

| | |
|---|---|
| Ferric Chloride Concentration | Below 2 ppm |
| Chlorine Rate | 3.20 moles/hour |
| Ethylene Rate | 1.00 moles/hour |
| Recycle Rate | .82 mole/hour |
| Composition of Recycle: | |
| | Mole % |
| 1,2-dichlorethane | 14.2 |
| 1,1,2-trichlorethane | 85.8 |
| tetrachlorethanes | NIL |
| Composition of Reactor Contents: | |
| | Mole % |
| 1,2-dichlorethane | |
| 1,1,2-trichlorethane | 39.5 |
| tetrachlorethanes | 38.4 |
| pentachlorethane | 14.0 |
| hexachlorethane | 1.6 |
| Chlorine Conversion | 99% |
| Ethylene Conversion | 96% |
| Ratio Chlorine/Ethylene Reacting | 3.3 |
| Net Product Rate | .96 mole/hour |
| Net Product Composition: | |
| | Mole % |
| 1,2-dichlorethane | NIL |
| 1,1,2-trichlorethane | NIL |
| tetrachlorethanes | 71.1 |
| pentachlorethane | 25.9 |
| hexachlorethane | 3.0 |

This experiment is conducted at 50° C. under 1 atmosphere of pressure.

EXAMPLE 11

| | |
|---|---|
| Ferric Chloride Concentration | 55 ppm wt. |
| Chlorine Rate | 3.20 moles/hours |
| Ethylene Rate | 1.00 mole/hour |
| Recycle Rate | 0.82 mole/hour |
| Composition of Recycle: | |
| | Mole % |
| 1,2,-dichlorethane | 14.2 |
| 1,1,1-trichlorethane | 85.8 |
| tetrachlorethanes | NIL |
| Composition of Reactor Contents: | |
| | Mole % |
| 1,2-dichlorethane | 23.8 |
| 1,1,2-trichlorethane | 59.5 |
| tetrachlorethanes | 15.5 |
| pentachlorethane | 1.2 |
| hexachlorethane | NIL |
| Chlorine Conversion | 62% |
| Ethylene Conversion | 99% |
| Ration Chlorine/Ethylene Reacting | 2.0 |
| Net Product Rate | .99 mole/hour |
| Net Product Composition: | |
| | Mole % |
| 1,2-dichlorethane | 31.7 |
| 1,1,2-trichlorethane | 37.8 |
| tetrachlorethanes | 28.3 |
| pentachlorethane | 2.2 |
| hexachlorethane | NIL |

This example is also conducted at 50° C. under 1 atmosphere of pressure.

EXAMPLE 12

Dehydrochlorination of Symmetrical Tetrachlorethane

A stainless steel pressure vessel having a charge port and vapor take-off was fitted with a thermowell and thermostat and the vessel was positioned within an electrically heated mantle controlled by the thermostat. Into the pressure vessel about 50 grams of activated carbon of particle size 4 × 10 mesh were placed followed by about 1,500 grams of s-tetrachlorethane (1,1,2,2). The vessel was then purged with nitrogen to displace the air. A product take-off line which contained therein an automatic pressure control means including a control valve was then connected to the product vapor take-off port. The product take-off line was extended to an absorption system for recovery of the dehydrochlorinated organic product and HCl Heat was then applied to the mantle to bring the liquid symmetrical tetrachlorethane to a temperature of 225° C. During the heating the pressure was permitted to increase to 127 pounds per square inch absolute (p.s.i.a.). The heating mantle and the automatic pressure controller were adjusted to maintain this temperature and pressure and to supply heat for dehydrochlorination. While operating under these conditions the liquid phase reaction mixture was found to have about 8 by weight trichlorethylene, which percentage remained substantially the same throughout the dehydrochlorination reaction. The off gases were absorbed and condensed for analysis of the HCl and organics. These were found to be HCl and trichlorethylene in substantially equi-molar quantities plus tetrachlorethane. Under the conditions given about 40 percent of the off gases by volume consisted of HCl and trichlorethylene. The volume ratio of chlorinated ethylene product to chlorinated ethane in the evolved gases was about 0.35. The off gases were condensed by absorbing the HCl in cold water. The cold water then condensed the organics to a separate liquid phase which was analyzed using standard separation and analytical techniques.

EXAMPLES 13

Dehydrochlorination of Asymmetrical Tetrachloroethane (1,1,1,2)

The method of Example 12 was carried out using about 1,500 grams of 1,1,1,2 tetrachlorethane in place of the 1,1,2,2 tetrachlorethane. However, a pressure of 149 p.s.i.a. was employed while the temperature was maintained at 225° C. These conditions resulted in a liquid phase reaction mixture containing 1,1,2 tetrachlorethane and about 8 percent by weight trichlorethylene. The condensed off gases were found to contain HCl and trichlorethylene in equi-molar quantities and 1,1,1,2 tetrachlorethane. About 35 percent of the off gases consisted of HCl and tetrachlorethylene The volume ratio of trichlorethylene to tetrachlorethane in the evolved vapors was about 0.27.

EXAMPLE 14
Dehydrochlorination of Pentachlorethane

The method of Example 12 was carried out using abut 1,500 grams of pentachlorethane in place of 1,1,2,2 tetrachlorethane. The temperature was maintained at 225° C. and the pressure within the vessel was maintained at 76 p.s.i.a. These conditions resulted in a liquid phase reaction mixture containing about 8 percent by weight tetrachlorethylene. The volume ratio of tetrachlorethylene to pentachlorethane in the evolved gases was about 0.27 and the off gases were found to contain HCl and tetrachlorethylene in equi-molar quantities and pentachlorethane. About 35 percent of the off gases consisted of HCl and tetrachlorethylene.

EXAMPLE 15
Dehydrochlorination of a Mixture of Tetrachlorethanes and Pentachlorethane The method of Example 12 was carried out using about 1,500 grams of a liquid mixture comprising 1,1,2,2 tetrachlorethane, 1,1,1,2 tetrachlorethane and pentachlorethane. The temperature was maintained at 225° C. and the pressure was held at 127 p.s.i.a. These conditions resulted in a liquid phase reaction mixture containing approximately 4 percent by weight of trichlorethylene and 10 percent by weight of tetrachlorethylene. The evolved gases contained HCl trichlorethylene, tetrachlorethylene and a mixture of the chlorinated ethanes. The volume ratio of the chlorinated ethylene compounds to the polychlorinated ethanes in the evolved gases was about 0.35. The amount of trichlorethylene by volume was approximately the same as the amount of tetrachlorethylene by volume with the HCl being present in an amount equivalent to 1 mol for each mol of trichlorethylene and 1 mol for each mol of tetrachlorethylene.

EXAMPLE 16
Dehydrochlorination of a Mixture of Tetrachlorethanes and Pentachlorethane The method of Example 15 was carried out at a temperature of 225° C. and the pressure was maintained at 183 p.s.i.a. These conditions resulted in a liquid phase reaction mixture containing about 16 percent by weight of trichlorethylene and 5 percent by weight of tetrachlorethylene. The evolved gases contained the chlorinated ethylene compounds and polychlorinated ethanes in a volume ratio of about 0.9

EXAMPLE 17
Dehydrochlorination of a Mixture of Tetrachlorethanes and Pentachlorethane The method of Example 15 was carried out at a temperature of 225° C. and a pressure of 166 p.s.i.a. The conditions resulted in a liquid phase reaction mixture containing about 11.5 percent by weight of trichlorethylene and 11.5 percent by weight of tetrachlorethylene. The evolved gases contained the chlorinated ethylene compounds and polychlorinated ethanes in a volume ratio of about 1.0.

EXAMPLE 18
Dehydrochlorination of Asymmetrical Tetrachlorethane

The method of Example 13 was carried out at a temperature of 250° C. and a pressure of 197 p.s.i.a. These conditions resulted in a liquid phase reaction mixture containing about 5 percent by weight of trichlorethylene. The evolved gases contained trichlorethylene and asymmetrical tetrachlorethane in a volume ratio of about 0.14.

EXAMPLE 19
Dehydrochlorination of Asymmetrical Tetrachlorethane

The method of Example 13 was carried out at a temperature of 200° C. and a pressure of 155 p.s.i.a. The conditions resulted in a liquid phase reaction mixture containing about 25 percent by weight of trichlorethylene. The evolved gases contained trichlorethylene and asymmetrical tetrachlorethane in a volume ratio of about 1.1.

EXAMPLE 20
Dehydrochlorination of Pentachlorethane

The method of Example 14 was carried out at a temperature of 200° C. and a pressure of 43 p.s.i.a. These conditions resulted in a liquid phase reaction mixture containing about 5 percent by weight of tetrachlorethylene. The evolved gases contained tetrachlorethylene and pentachlorethane in a volume ratio of about 0.15.

EXAMPLE 21
Dehydrochlorination of Pentachlorethane

The method of Example 14 was carried out at a temperature of 250° C. and a pressure of 179 p.s.i.a. These conditions resulted in a liquid phase reaction mixture containing about 26 percent by weight of tetrachlorethylene. The evolved gases contained tetrachlorethylene and pentachlorethane in a volume ratio of about 1.0.

EXAMPLE 22
Dehydrochlorination of a Mixture of Symmetrical and Asymmetrical Tetrachlorethanes The method of Example 12 was carried out using about 1,500 grams of a mixture of 1,1,2,2 tetrachlorethane and 1,1,1,2 tetrachlorethane in equal amounts by weight in place of the 1,1,2,2 tetrachlorethane of Example 12. The temperature was maintained at 225° C. and a pressure of 172 p.s.i.a. was maintained. These conditions resulted in a liquid phase reaction mixture containing about 15 percent by weight of trichlorethylene. The evolved gases contained trichlorethylene and tetrachlorethanes in a volume ratio of about 0.6.

From the above examples, it will be seen that the weight percentage of the chlorinated ethylene products in the liquid phase undergoing dehydrochlorination may be controlled in the practice of the process of the present invention by means of the temperature-pressure relationship. This provides great flexibility to the process since there is an optimum weight percentage for a given dehydrochlorination reaction, and we have found there is an optimum range of such weight percentage in the production of both trichlorethylene and tetrachlorethylene. For trichlorethylene and tetrachlorethylene, this relationship between pressures and temperatures for various weight percentages is illustrated in the following tables.

TABLE II
Dehydrochlorination of Tetrachlorethanes to Trichlorethylene

| operating Temperature °C. | Operating Pressure p.s.i.a | Vapor Ratio Trichlorethylene/ Tetrachlorethanes | Liquid Composition (Organics) Weight % | |
|---|---|---|---|---|
| | | | trichlor- ethylene | tetra- chlor- ethanes |
| 190 | 67 | 0.21 | 5 | 95 |
| 190 | 82 | 0.44 | 10 | 90 |
| 190 | 98 | 0.69 | 15 | 85 |
| 190 | 113 | 0.98 | 20 | 80 |
| 190 | 128 | 1.32 | 25 | 75 |
| 190 | 142 | 1.68 | 30 | 70 |
| 200 | 79 | 0.20 | 5 | 95 |
| 200 | 97 | 0.42 | 10 | 90 |
| 200 | 115 | 0.66 | 15 | 85 |
| 200 | 132 | 0.94 | 20 | 80 |
| 200 | 149 | 1.26 | 25 | 75 |
| 200 | 165 | 1.61 | 30 | 70 |
| 225 | 122 | 0.18 | 5 | 95 |
| 225 | 148 | 0.39 | 10 | 90 |
| 225 | 174 | 0.62 | 15 | 85 |
| 225 | 199 | 0.87 | 20 | 80 |
| 225 | 223 | 1.17 | 25 | 75 |
| 225 | 246 | 1.49 | 30 | 70 |
| 250 | 185 | 0.17 | 5 | 95 |
| 250 | 221 | 0.35 | 10 | 90 |
| 250 | 256 | 0.56 | 15 | 85 |
| 250 | 290 | 0.79 | 20 | 80 |
| 250 | 324 | 1.06 | 25 | 75 |
| 250 | 356 | 1.35 | 30 | 70 |

TABLE III
Dehydrochlorination of Pentachlorethane to Tetrachlorethylene

| operating Temperature °C. | Operating Pressure p.s.i.a. | Vapor Ratio Tetrachlorethylene/ Pentachlorethane | Liquid Compositions (Organics) Weight % | |
|---|---|---|---|---|
| | | | Tetra- chlor- ethylene | Penta- chlor- ethane |
| 190 | 36 | 0.16 | 5 | 95 |
| 190 | 43 | 0.34 | 10 | 90 |
| 190 | 50 | 0.54 | 15 | 85 |
| 190 | 56 | 0.77 | 20 | 80 |
| 190 | 62 | 1.01 | 25 | 75 |
| 190 | 69 | 1.31 | 30 | 70 |
| 200 | 43 | 0.16 | 5 | 95 |
| 200 | 51 | 0.33 | 10 | 90 |
| 200 | 59 | 0.53 | 15 | 85 |
| 200 | 66 | 0.75 | 20 | 80 |
| 200 | 74 | 0.99 | 25 | 75 |
| 200 | 81 | 1.28 | 30 | 70 |
| 225 | 67 | 0.15 | 5 | 95 |
| 225 | 80 | 0.32 | 10 | 90 |
| 225 | 92 | 0.52 | 15 | 85 |
| 225 | 104 | | 20 | 80 |
| 225 | 115 | 0.97 | 25 | 75 |
| 225 | 126 | 1.25 | 30 | 70 |
| 250 | 104 | 0.15 | 5 | 95 |
| 250 | 122 | 0.32 | 10 | 90 |
| 250 | 141 | 0.51 | 15 | 85 |
| 250 | 158 | 0.72 | 20 | 80 |
| 250 | 175 | 0.95 | 25 | 75 |
| 250 | 192 | 1.22 | 30 | 70 |

The above data demonstrates that by varying reaction conditions the ratio of chlorinated ethylene product to polychlorinated ethane in the evolved vapors is varied as is the liquid composition. Generally speaking, when conditions are varied to provide the lower ratios, less efficient heat utilization results and process costs tend to increase. At the higher ratios, costs tend to rise due to lessened efficiency in the use of the activated carbon. As hereinabove described, mol ratios of chlorinated ethylene compound to polychlorinated ethane in the gases evolved from the dehydrochlorination reaction should be from about 0.01 to about 100, preferably from about 0.05 to about 50, and most preferably from about 0.1 to about 10.

Maintenance of a specified ratio of unsaturated product to polychlorinated ethane in the evolved vapor in turn results in maintaining a certain optimum concentration of unsaturated product in the liquid phase.

For convenience and clarity, the present invention has been illustrated in the above examples as running continuously from a fixed initial charge of starting material which is used u as the dehydrochlorination process proceeds. In actual commercial operation the process may proceed in the same manner but the feed material is continuously introduced into the reaction vessel at a rate corresponding to the rate of dehydrochlorination. A small amount of reaction mixture containing suspended used carbon is periodically withdrawn from the reactor and is replaced by new activated carbon which may be added with the incoming feed or may otherwise be introduced into the reaction vessel.

The following example is illustrative of the commercial continuous process referred to above.

EXAMPLE 23

Continuous Process Dehydrochlorination of Tetrachlorethanes-Pentachlorethane Mixture A steel pressure vessel having a heating jacket and an internal agitator is charged with a mixture of tetrachlorethanes (20 mol % 1,1,2,2 tetrachlorethane, 20 mol % 1,1,1,2 tetrachlorethane), 33 mol % pentachlorethane, 15 mol % trichlorethylene and 12 mol % tetrachlorethylene to which there is added about 5 percent by weight activated carbon 325 mesh. The steel pressure vessel has a liquid inlet, a liquid draw-off and a single vapor draw-off leading to a cooler-condenser and a pressure reducer. Heat is supplied through the heating jacket until the reaction mixture is heated to 225° C. and the pressure is permitted to rise to an operating pressure of 166 p.s.i.a. This pressure is maintained by an automatic control valve in the vapor draw-off line which permits the escape of cooled effluent gas. The gas stream entering the cooler-condenser has a composition of 0.33 mol fraction HCl, 0.24 mol fraction trichlorethylene, 0.09 mol fraction tetrachlorethylene and 0.34 mol fraction polychlorinated ethanes. In the cooler-condenser organics are condensed.

After separation from the HCl stream, the condensed organics are separated by fractionation, polychlorinated ethylene product is recovered and the polychlorinated ethanes are returned to the reaction vessel through the liquid inlet. For each 100 pounds of polychlorinated ethylenes produced, a portion of the reactor fluid is removed through a pressure control valve positioned in the liquid draw-off line. The volume thus withdrawn is the volume calculated to contain one-fourth pound of activated carbon for each 100 pounds of chlorinated ethylenes produced. After separation from the liquid the carbon may be discarded. A corresponding weight of fresh activated carbon is introduced into the pressure vessel through the liquid inlet. The liquid portion is stripped to separate the lights from the heavies (molecular weight above pentachlorethane). The lights are returned to the reactor. Liquid feed made up of new feed and recycled polychlorinated ethanes is added at a rate corresponding to the dehydrochlorination rate and in proportion to the trichlorethylene and tetrachlorethylene being produced. Heat is supplied through the jacket at a rate sufficient to maintain the system temperature substantially constant at 225° C. while also supplying the heat for maintaining the dehydrochlorination reaction as measured by the effluent stream. The process thus provides HCl, trichlorethylene and tetrachlorethylene on a continuous and uniform basis without the necessity of changing the operating conditions to offset changes in the activated carbon.

A satisfactory activated carbon for use in the practice of the present invention is Pittsburgh Activated Carbon Type BL or Type BPL or their equivalents. These products are made and sold by Pittsburgh Activated Carbon Company of Pittsburgh, Pa. The total amount of activated carbon in the system may, of course, be varied within wide limits, provided an adequate total activated carbon surface is immersed in the liquid phase to provide a satisfactory rate of dehydrochlorination. The preferred range is 5 to 20 percent by weight and the particle size may vary from as coarse as through 4 mesh and retained on 10 mesh (4 × 10 mesh) to finer than through 325 mesh. In most sizes, the activated carbon will be in suspension since the liquid phase is continuously agitated by the escape of the product gases. However, in large scale operations this may be supplemented by mechanical agitation to insure uniformity. The product gases may be cooled by known cooling means while still substantially at operating pressure to give a condensed organic phase low in HCl and an HCl vapor phase low in organic content. HCl in this form is recoverable by known means and is available for other use at essentially operating pressure. The condensed organic liquid phase is removed from the system through a suitable control valve. The condensed organic liquid phase is further processed in known ways to obtain the individual purified and stabilized chlorinated ethylene products.

Where the processes of the present invention are run continuously to produce one or more chlorinated ethylene products, the corresponding feed materials are introduced in amounts corresponding to the amounts of product removed per unit of time from the reactor. This therefore, premits steady state operation of the reactor. Since HCl is present in the system, it is desirable to operate under essentially anhydrous conditions to avoid possible corrosion of the equipment.

In describing the present invention, several examples have been set forth in which specific operating conditions are specified whereby particular polychlorinated ethanes are dehydrochlorinated in liquid phase under conditions of elevated pressure and temperature to yield chlorinated ethylene compounds and HCl. However, various changes and modifications may be made in such operating conditions without departing from the scope of the invention, including the incorporation or presence in the feed of other polychlorinated ethanes such as dichloroethane and trichloroethane.

EXAMPLE 24

Polychlorinated ethanes were produced as follows. Ethylene was continuously fed into a liquid-phase reactor at a rate of 9.84 mols/hr., together with chlorine at a rate of 28.11 mols/hr., and recycle stream at a rate of 120.9 mols/hr., said recycle stream having the following composition:

| Compound | Mol % |
| --- | --- |
| 1,2-dichlorethane | 12.28 |
| 1,1,2-trichloroethane | 87.72 |
| tetrachlorethanes | NIL |
| pentachlorethane | NIL |
| hexachlorethane | NIL |
| Total | 100.00 |

Vent gases containing unreacted ethylene, together with volatilized chlorinated hydrocarbons and HCl were withdrawn and subjected to condensation; condensed chlorinated hydrocarbons were returned to the reactor, and the net cooled gas consisted largely of unconverted ethylene and HCl made in the reactor. During this period, the reactor was maintained at a temperature of 120° C. and at a pressure of 100 p.s.i.g. Chlorine conversion was essentially complete, and ethylene conversion was approximately 94 percent. Reactor contents were continuously withdrawn at the rate of 130.2 mols/hr. and had a composition, exclusive of dissolved HCl, as follows:

| Compound | Mol % |
| --- | --- |
| 1,2-dichlorethane | 11.40 |
| 1,1,2-trichlorethane | 81.47 |
| tetrachlorethanes | 6.94 |
| pentachlorethane | 0.18 |
| hexachlorethane | 0.01 |
| Total | 100.00 |

Upon distillation to provide the amount of recycle stream noted above, the net product was recovered at a rate of 9.28 mols/hr. and had a composition as follows:

| Compound | Mol % |
| --- | --- |
| 1,2-dichlorethane | NIL |
| 1,1,2-trichlorethane | NIL |
| tetrachlorethanes | 97.41 |
| pentachlorethane | 2.56 |
| hexachlorethane | 0.03 |
| Total | 100.00 |

The tetrachlorethanes shown above consisted of 1,1,2,2-tetrachlorethane and 1,1,1,2-tetrachlorethane in a mol ratio of about 1:1. The above product stream was fractionated to separate out the lower boiling 1,1,1,2-tetrachlorethane and obtain a mixture for dehydrochlorination which had the following composition:

| Compound | Mol % |
| --- | --- |
| 1,1,2,2-tetrachlorethane | 95.0 |
| pentachlorethane | 5.0 |
| Total | 100.00 |

This net product stream which amounted to 4.76 mols/hr. was then fed to a dehydrochlorination reactor to produce the corresponding chlorethylenes as outlined below.

The feed stream containing approximately 95 mol % 1,1,2,2 tetrachlorethane and 5 mol % pentachlorethane was passed as a liquid under a pressure of about 115 p.s.i.g. through a reactor containing BPL activated carbon (4 × 10 mesh) while supplying heat to maintain the temperature of the reactor at about 220° C. Under these conditions dehydrochlorination of the tetrachlorethane and pentachlorethane took place giving trichlorethylene, perchlorethylene and HCl as the main reaction products. The combined liquid and vapor stream leaving the reactor was cooled while still under pressure to about 20° C. The resulting condensed and cooled chlorinated organics were then removed from the system through a pressure operated control valve. The cooled HCl gas essentially free of chlorinated organics was also removed from the system through a pressure operated control valve. Operating data are given in the following table:

| | |
|---|---|
| Reaction temperature — °C | 220 |
| Reaction pressure — p.s.i.g. | 115 |
| Wgt. of activated carbon used — gm | 50 |
| Duration of run — hrs. | 60 |
| Total mols fed | 286 |
| Mols 1,1,2,2 tetrachlorethane reacted | 43.2 |
| Mols trichlorethylene formed | 42.3 |
| Mols pentachlorethane reacted | 2.7 |
| Mols perchlorethylene formed | 2.6 |
| Mols HCl formed | 45.3 |
| Mol ratio-chlorinated ethylenes to chlorinated ethanes in product | 0.19 |

EXAMPLE 25

Using the procedure of Example 24, polychlorinated ethanes were produced as follows: Ethylene was continuously fed into a liquid-phase reactor at a rate of 4.44 mols/hr., together with chlorine at a rate of 14.12 mols/hr., and recycle stream at a rate of 13.99 mols/hr., said recycle stream having the following composition:

| Compound | Mol % |
|---|---|
| 1,2-dichlorethane | 8.07 |
| 1,1,2-trichlorethane | 57.66 |
| tetrachlorethanes | 34.27 |
| pentachlorethane | NIL |
| hexachlorethane | NIL |
| Total | 100.00 |

Vent gases containing unreacted ethylene, together with volatilized chlorinated hydrocarbons and HCl were withdrawn and subjected to condensation; condensed chlorinated hydrocarbons were returned to the reactor, and the net cooled gas consisted largely of unconverted ethylene and HCl made in the reactor. During this period the reactor was maintained at a temperature of 140° C. and at a pressure of 100 p.s.i.g. Chlorine conversion was essentially complete and ethylene conversion was approximately 96 percent. Reactor contents were continuously withdrawn at the rate of 18.26 mols/hr. and had a composition, exclusive of dissolved HCl, as follows:

| Compound | Mol % |
|---|---|
| 1,2-dichlorethane | 6.19 |
| 1,1,2-trichlorethane | 44.19 |
| tetrachlorethanes | 42.75 |
| pentachlorethane | 6.41 |
| hexachlorethane | 0.46 |
| Total | 100.00 |

Upon distillation to provide the amount of recycle stream noted above, the net product was recovered at a rate of 4.27 mols/hr. and had a composition as follows:

| Compound | Mol % |
|---|---|
| 1,2-dichlorethane | NIL |
| 1,1,2-trichlorethane | NIL |
| tetrachlorethanes | 70.56 |
| pentachlorethane | 27.44 |
| hexachlorethane | 2.00 |
| Total | 100.00 |

The tetrachlorethanes shown above consisted of 1,1,2,2-tetrachlorethane and 1,1,1,2-tetrachlorethane in a mol ratio of about 1:1. The above product stream was fractionated to separate out the higher boiling hexachlorethane and obtain a mixture for dehydrochlorination which had the following composition:

| Compound | Mol % |
|---|---|
| 1,1,2,2-tetrachlorethane | 36.0 |
| 1,1,1,2-tetrachlorethane | 36.0 |
| pentachlorethane | 28.0 |
| Total | 100.00 |

This net product stream which amounted to 4.18 mols/hr. was then fed a dehydrochlorination reactor to produce the corresponding chlorethylenes as outlined below: The feed stream having the composition shown above was passed as a liquid under a pressure of about 125 p.s.i.g. through the reactor containing BPL activated carbon (4 × 10 mesh) while supplying heat to maintain the temperature of the reactor at about 225° C. Under these conditions dehydrochlorination of the tetrachlorethanes and pentachlorethane took place giving trichlorethylene, perchlorethylene and HCl as the main reaction products. Operating data are given in the following table:

| | |
|---|---|
| Reaction temperature °C. | 225 |
| Reaction pressure p.s.i.g. | 125 |
| Weight of activated carbon used gm. | 50 |
| Duration of run — hrs. | 51 |
| Total mols fed | 225 |
| Mols of 1,1,1,2 and 1,1,2,2 tetrachlorethane reacted | 41.5 |
| Mols trichlorethylene formed | 40.7 |
| Mols pentachlorethane reacted | 27.4 |
| Mols perchlorethylene formed | 26.8 |
| Mols HCl formed | 68.1 |
| Mol ratio-chlorinated ethylenes to chlorinated ethanes in product | 0.37 |

EXAMPLE 26

Using the procedure of Example 24, polychlorinated ethanes were produced as follows: Ethylene was continuously fed into a liquid-phase reactor at a rate of 2.36 mols/hr., together with chlorine at a rate of 9.33 mols/hr., and recycle stream at a rate of 25.89 mols/hr., said recycle stream having the following composition:

| Compound | Mol % |
|---|---|
| 1,2-dichlorethane | 3.21 |
| 1,1,2-trichlorethane | 22.96 |
| tetrachlorethanes | 73.83 |
| pentachlorethane | NIL |
| hexachlorethane | NIL |
| Total | 100.00 |

Vent gases containing unreacted ethylene, together with volatilized chlorinated hydrocarbons and HCl were withdrawn and subjected to condensation; condensed chlorinated hydrocarbons were returned to the reactor, and the net cooled gas consisted largely of unconverted ethylene and HCl made in the reactor. During this period, the reactor was maintained at a temperature of 140° C. and at a pressure of 100 p.s.i.g. Chlorine conversion was essentially complete and ethylene conversion was approximately 98 percent. Reactor contents were continuously withdrawn at the rate of 28.21 mols/hr. and had a composition, exclusive of dissolved HCl, as follows:

| Compound | Mol % |
|---|---|
| 1,2-dichlorethane | 2.95 |
| 1,1,2-trichlorethane | 21.07 |
| tetrachlorethanes | 67.93 |
| pentachlorethane | 7.64 |
| hexachlorethane | 0.41 |
| Total | 100.00 |

Upon distillation to provide the amount of recycle stream noted above, the net product was recovered at a rate of 2.32 mols/hr. and had a composition as follows:

| Compound | Mol % |
|---|---|
| 1,2-dichlorethane | NIL |
| 1,1,2-trichlorethane | NIL |
| tetrachlorethanes | 1.90 |
| pentachlorethane | 93.10 |
| hexachlorethane | 5.00 |
| Total | 100.00 |

The tetrachlorethanes shown above consisted of 1,1,2,2-tetrachlorethane and 1,1,1,2-tetrachlorethane in a mol ratio of about 1:1. The above product stream was fractionated to separate out the higher boiling hexachlorethane and obtain a mixture for dehydrochlorination which had the following composition:

| Compound | Mol % |
|---|---|
| 1,1,2,2-tetrachlorethane | 1.0 |
| 1,1,1,2-tetrachlorethane | 1.0 |
| pentachlorethane | 98.0 |
| Total | 100.00 |

This net product stream which amounted to 2.20 mols/hr. was then fed to a dehydrochlorination reactor to produce the corresponding chlorethylenes as outlined below.

The fed stream consisting essentially of pentachlorethane (98 percent) was passed as a liquid under a pressure of about 240 p.s.i.g. through the reactor containing BPL activated carbon (4 × 10 mesh) while supplying heat to maintain the temperature of the reactor at about 235° C. Under these conditions dehydrochlorination of the pentachlorethane took place giving perchlorethylene and HCl as the main reaction products. Operating data are given in the following table:

| | |
|---|---|
| Reaction temperature °C. | 235 |
| Reaction pressure — p.s.i.g. | 240 |
| Wt. of activated carbon used — gm. | 50 |
| Duration of runs — hrs. | 40 |
| Total mols fed | 88 |
| Mols pentachlorethane reacted | 56.5 |
| Mol perchlorethylene formed | 55.5 |
| Mols HCl formed | 55.9 |
| Mol ratio—chlorinated ethylenes to chlorinated ethanes in product | 1.7 |

EXAMPLE 27

Using the procedure of Example 24, polychlorinated ethanes were produced as follows: Ethylene was continuously fed into a liquid-phase reactor at a rate of 1.58 mols/hr., together with chlorine at a rate of 5.02 mols/hr., and recycle stream at a rate of 1.90 mols/hr., said recycle stream having the following composition:

| Compound | Mol % |
|---|---|
| 1,2-dichlorethane | 12.28 |
| 1,1,2-trichlorethane | 87.72 |
| tetrachlorethanes | NIL |
| pentachlorethane | NIL |
| hexachlorethane | NIL |
| Total | 100.00 |

Vent gases containing unreacted ethylene, together with volatilized chlorinated hydrocarbons and HCl were withdrawn and subjected to condensation; condensed chlorinated hydrocarbons were returned to the reactor, and the net cooled gas consisted largely of unconverted ethylene and HCl made in the reactor. During this period, the reactor was maintained at a temperature of 120° C. and at a pressure of 100 p.s.i.g. Chlorine conversion was essentially complete, and ethylene conversion was approximately 98 percent. Reactor contents were continuously withdrawn at the rate of 3.45 mols/hr. and had a composition, exclusive of dissolved HCl, as follows:

| Compound | Mol % |
|---|---|
| 1,2-dichlorethane | 6.77 |
| 1,1,2-trichlorethane | 48.40 |
| tetrachlorethanes | 34.97 |
| pentachlorethane | 8.74 |
| hexachlorethane | 1.12 |
| Total | 100.00 |

Upon distillation to provide the amount of recycle stream noted above, the net product was recovered at a rate of 1.55 mols/hr. and had a composition as follows:

| Compound | Mol % |
|---|---|
| 1,2-dichlorethane | NIL |
| 1,1,2-trichlorethane | NIL |
| tetrachlorethanes | 78.01 |
| pentachlorethane | 19.50 |
| hexachlorethane | 2.49 |
| Total | 100.00 |

The tetrachlorethanes shown above consisted of 1,1,2,2-tetrachlorethane and 1,1,1,2-tetrachlorethane in a mol ratio of about 1:1. The above produce stream was fractionated to separate out the higher boiling hexachlorethane and obtain a mixture for dehydrochlorination which had the following composition:

| Compound | Mol % |
| --- | --- |
| 1,1,2,2-tetrachlorethane | 40.0 |
| 1,1,1,2-tetrachlorethane | 40.0 |
| pentachlorethane | 20.0 |
| Total | 100.00 |

This net product stream which amounted to 1.51 mols/hr. was then fed to a dehydrochlorination reactor to produce the corresponding chlorethylenes as outlined below.

The feed stream having the composition shown above was passed as a liquid under a pressure of about 270 p.s.i.g. through the reactor containing BPL activated carbon (4 × 10 mesh) while supplying heat to maintain the temperature of the reactor at about 250° C. Under these conditions dehydrochlorination of the tetrachlorethanes and pentachlorethane took place to the extent of about 90 percent, giving trichlorethylene, perchlorethylene and HCl as the main reaction products. Operating data are given in the following table:

| | |
| --- | --- |
| Reaction temperature — °C. | 250 |
| Reaction pressure — p.s.i.g. | 270 |
| Wt. of activated carbon used — gm. | 50 |
| Duration of run — hrs. | 51 |
| Total mols fed | 77 |
| Mols of 1,1,1,2 and 1,1,2,2 tetrachlorethane reacted | 56.0 |
| Mols trichlorethylene formed | 55.5 |
| Mols perchlorethylene formed | 14.8 |
| Mols pentachlorethane reacted | 15.0 |
| Mols HCl formed | 70.9 |
| Mol-ratio chlorinated ethylenes to chlorinated ethanes in product | 10.4 |

Having thus described our invention we claim:

1. A process for producing trichlorethylene, tetrachlorethylene or mixtures thereof which comprises the steps of:
   1. reacting chlorine and ethylene in the absence of light in a liquid body consisting essentially of chlorethanes, said liquid body having an average composition of at least three chlorine atoms per molecule;
   2. maintaining said liquid body at a temperature in the range of 0° to less than about 250° C.;
   3. removing at least a portion of said liquid body and separating said removed liquid body into a heavier product fraction containing chlorethanes having an average composition of more than four chlorine atoms per molecule and a lighter fraction having an average chlorine content which is lower than that of said first fraction and at least three chlorine atoms per molecule the mol ratio of the heavier fraction to the lighter fraction being in the range 1:0.1 to 1:30;
   4. recycling at least a portion of the said lighter fraction as liquid body in a subsequent chlorination reaction in accordance with steps (1), (2) and (3); and
   5. dehydrochlorinating the heavier product fraction of step (3) at a temperature of from about 150° C. to below 300° C. in the liquid state while under positive pressure and in the presence of a contact material consisting essentially of activated carbon.

2. The process of claim 1, wherein a part of the activated carbon is removed as a suspension in the liquid reaction mixture and replaced by a corresponding amount of fresh activated carbon without interrupting the process.

3. The process of claim 1, wherein the elevated temperature is not more than about 250° C.

4. The process of claim 1, wherein the elevated temperature is in the range of from about 190° C. to not more than about 250° C., and the positive pressure is in the range of from about 35 p.s.i.a. to about 300 p.s.i.a.

5. The process of claim 1, wherein the heavier product fraction of step (3) is tetrachlorethane, in which the operating pressure of step (5) is maintained in the range of from 67 p.s.i.a. to 356 p.s.i.a. and in which the recoverable reaction products consist primarily of trichlorethylene and HCl.

6. The process of claim 1, wherein the heavier product fraction of step (3) is pentachlorethane, in which the operating pressure of step (5) is maintained in the range of from 36 p.s.i.a. to 192 p.s.i.a. and in which the recoverable reaction products consist primarily of tetrachlorethylene and HCl.

7. The process of claim 1, wherein the activated carbon is maintained in suspension in the reaction liquid.

8. The process of claim 1 wherein step (5) is carried out at a temperature in the range of from about 150° C.. to not more than about 250° C., wherein, the heavier product fraction of step (3) consists of at least one polychlorinated saturated ethane selected from the group consisting of 1,1,2,2 tetrachlorethane, 1,1,1,2 tetrachlorethane, pentachlorethane and mixtures thereof, continuously removing vapors comprised of HCl, said chlorinated ethylene and said polychlorinated saturated ethane, the mol ratio of chlorinated ethylene to polychlorinated saturated ethane being maintained in the range of from about 0.1 to about 10, and recovering said chlorinated ethylene.

* * * * *